US012489700B2

(12) United States Patent
Smallegange et al.

(10) Patent No.: US 12,489,700 B2
(45) Date of Patent: Dec. 2, 2025

(54) AUTOMATED ORF PROPAGATION IN BGP NETWORKS

(71) Applicant: Ciena Corporation, Hanover, MD (US)

(72) Inventors: Gerald Smallegange, Ottawa (CA); Anurag Prakash, Kanata (CA); Samson Punnammoottil Ninan, Ottawa (CA); Chaitanya Varma Guntumadugu, Ottawa (CA); Jayesh Jayachandra Kumar, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 18/660,970

(22) Filed: May 10, 2024

(65) Prior Publication Data
US 2025/0350550 A1 Nov. 13, 2025

(51) Int. Cl.
H04L 45/02 (2022.01)
(52) U.S. Cl.
CPC .................................... H04L 45/04 (2013.01)
(58) Field of Classification Search
CPC ....................................................... H04L 45/04
See application file for complete search history.

(56) References Cited

U.S. PATENT DOCUMENTS

| | | | | |
|---|---|---|---|---|
| 7,787,396 B1 * | 8/2010 | Nalawade | ................ | H04L 45/20 370/254 |
| 7,990,893 B1 * | 8/2011 | Singh | ...................... | H04L 45/04 370/254 |
| 8,116,308 B2 | 2/2012 | Ellis et al. | | |
| 8,504,727 B2 | 8/2013 | Mohan et al. | | |
| 8,666,247 B2 | 3/2014 | Srinivasan et al. | | |
| 8,682,160 B2 | 3/2014 | Prakash et al. | | |
| 8,718,471 B2 | 5/2014 | Prakash et al. | | |
| 8,818,198 B2 | 8/2014 | Trnkus et al. | | |
| 8,854,955 B2 | 10/2014 | Prakash et al. | | |
| 9,007,941 B1 * | 4/2015 | Miclea | ................ | H04L 65/1013 370/252 |
| 9,054,831 B2 | 6/2015 | Prakash et al. | | |
| 9,118,421 B2 | 8/2015 | Swinkels et al. | | |

(Continued)

FOREIGN PATENT DOCUMENTS

WO    WO-2008040240 A1 *    4/2008    ........... H04L 45/033

Primary Examiner — Brendan Y Higa
(74) Attorney, Agent, or Firm — Baratta Law PLLC; Lawrence A. Baratta, Jr.

(57) ABSTRACT

A Border Gateway Protocol (BGP) router is configured to obtain a plurality of prefix-lists one or more of (i) in local Outbound Route Filtering (ORF) and (ii) in ORF from upstream BGP routers, automatically apply logical set operations on the plurality of prefix-lists to determine an aggregated ORF for a downstream BGP router, and propagate the aggregated ORF to the downstream BGP router which uses the aggregated ORF for BGP advertisements. This can include auto generation of sequence numbers for the plurality of prefix-lists in the aggregated ORF, such that the downstream BGP router uses the sequence numbers for precedence in the advertisements. The prefix-lists can include one or more PERMIT lists, DENY lists, and a combination of PERMIT and DENY lists, with the logical set operations including union with the PERMIT lists, intersection with the DENY lists, and a combination of union, intersection, and set differences with the combination of PERMIT and DENY lists.

20 Claims, 5 Drawing Sheets

(56) References Cited

U.S. PATENT DOCUMENTS

| | | |
|---|---|---|
| 9,172,658 B2 | 10/2015 | Kakkar et al. |
| 9,197,493 B2 | 11/2015 | Holness et al. |
| 9,236,953 B2 | 1/2016 | Chhillar et al. |
| 9,407,359 B2 | 8/2016 | Swinkels et al. |
| 9,485,550 B2 | 11/2016 | Chhillar et al. |
| 9,485,551 B2 | 11/2016 | Prakash et al. |
| 9,538,264 B2 | 1/2017 | Surek et al. |
| 9,628,172 B2 | 4/2017 | Prakash et al. |
| 9,800,522 B2 | 10/2017 | Chhillar et al. |
| 9,860,169 B1 | 1/2018 | Ninan et al. |
| 9,985,724 B2 | 5/2018 | Prakash et al. |
| 10,003,867 B2 | 6/2018 | Prakash et al. |
| 10,097,306 B1 | 10/2018 | Chhillar et al. |
| 10,158,448 B2 | 12/2018 | Prakash et al. |
| 10,187,144 B2 | 1/2019 | Prakash et al. |
| 10,187,152 B2 | 1/2019 | Prakash et al. |
| 10,411,806 B2 | 9/2019 | Prakash et al. |
| 10,432,545 B2 | 10/2019 | Thomas et al. |
| 10,536,216 B1 | 1/2020 | Chhillar et al. |
| 10,567,274 B1 | 2/2020 | Thomas et al. |
| 10,972,359 B2 | 4/2021 | Miedema et al. |
| 11,055,155 B2 | 7/2021 | Prakash et al. |
| 11,169,862 B2 | 11/2021 | Miedema et al. |
| 11,303,549 B2 | 4/2022 | Arora et al. |
| 11,444,828 B2 | 9/2022 | Prakash et al. |
| 11,765,077 B1 | 9/2023 | Arora et al. |
| 11,909,622 B1 | 2/2024 | Yadav et al. |
| 2006/0245374 A1 * | 11/2006 | Patel ............... H04L 45/033 370/254 |
| 2007/0268817 A1 | 11/2007 | Smallegange et al. |
| 2008/0273472 A1 | 11/2008 | Bashford et al. |
| 2017/0163489 A1 | 6/2017 | Prakash et al. |
| 2019/0174211 A1 | 6/2019 | Swinkels et al. |
| 2021/0119903 A1 | 4/2021 | Skalecki et al. |
| 2021/0266251 A1 | 8/2021 | Yadav et al. |
| 2022/0224629 A1 | 7/2022 | Mada et al. |
| 2024/0073125 A1 | 2/2024 | Yadav et al. |

* cited by examiner

WHERE {A} REPRESENTS PREFIX-LIST FOR ACTION PERMIT, AND {B U A} REPRESENTS A UNION SET OF THE PREFIX-LIST

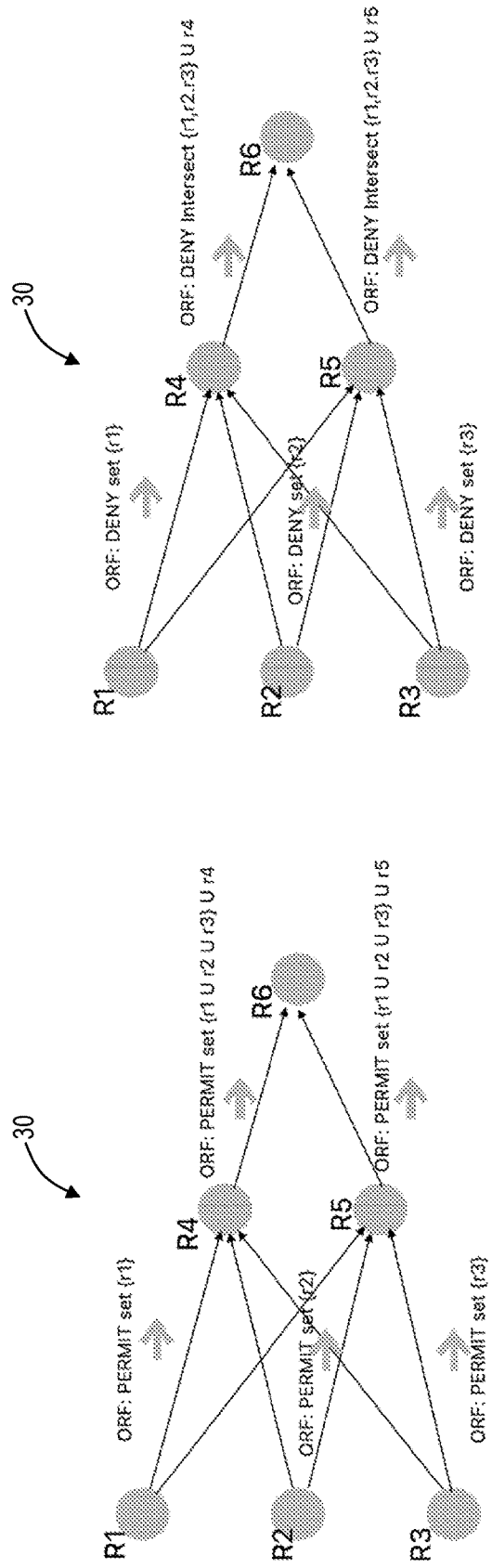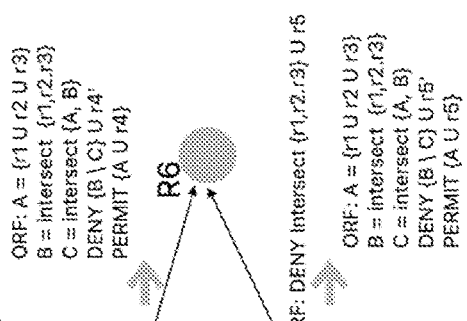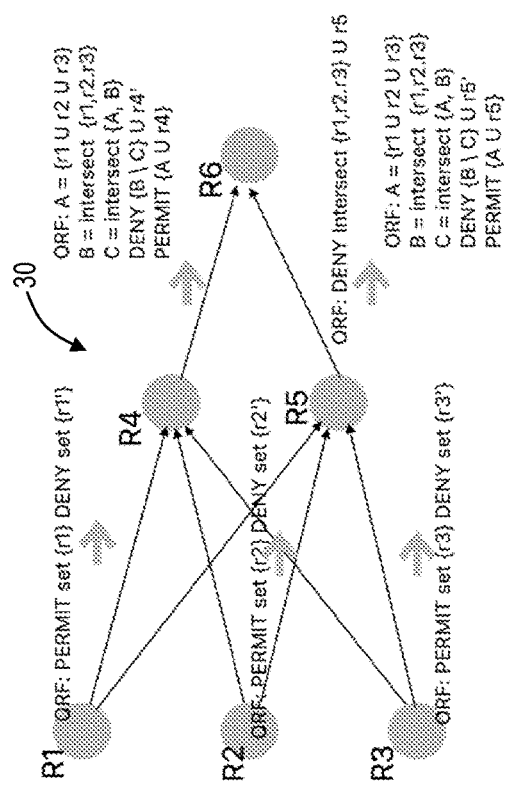
FIG. 3A
FIG. 3B
FIG. 3C

AUTOMATED ORF PROPAGATION IN BGP NETWORKS

FIELD OF THE DISCLOSURE

The present disclosure relates generally to networking and computing. More particularly, the present disclosure relates to systems and methods for automated Outbound Route Filter (ORF) propagation in Border Gateway Protocol (BGP) networks.

BACKGROUND OF THE DISCLOSURE

Outbound Route Filtering (ORF) is a feature used in networking, particularly with Border Gateway Protocol (BGP), designed to improve the efficiency and manageability of network routing information exchange. ORF is described, e.g., in RFC 5291, "Outbound Route Filtering Capability for BGP-4," August 2008, the contents of which are incorporated by reference. ORF allows a BGP router to send a list of filtering rules to its BGP peers, specifying which routes the BGP router is interested in receiving. This mechanism is primarily aimed at optimizing the process of route advertisement and reducing unnecessary network traffic and processing load on BGP routers. ORF works by establishing a set of rules or policies that are sent from a BGP router to its BGP peers. These policies dictate the types of routing updates or advertisements that the BGP router wishes to receive from these peers. The receiving peers then apply these filters to their outbound routing updates, ensuring that only the routes matching the criteria are sent to the BGP router that provided the ORF policies. Benefits include efficiency, improved performance, scalability, and reduced administrative overhead. Disadvantages include a large amount of manual configuration, especially in propagating ORF filters across different levels, with such manual configuration being error prone leading to network outages.

BRIEF SUMMARY OF THE DISCLOSURE

The present disclosure relates to systems and methods for automated Outbound Route Filter (ORF) propagation in networks. Conventionally, ORF aggregation is a manual process, which is cumbersome and prone to errors. The present disclosure includes autonomous ORF aggregation at BGP routers which include a permit filters, deny filters, or a combination thereof for aggregating upstream/downstream advertisements across the network. To have more controlled behavior across iBGP and external BGP (eBGP) interfaces, a configuration parameter can be added to the BGP protocol to enable/disable such ORF aggregation for PERMIT/DENY actions. BGP is known to be a chatty protocol, and no automated mechanism exists to safeguard a network from invalid or missing config. The present disclosure can be provisioned to be propagated across an internal BGP (iBGP) network and eBGP interfaces, safeguarding the network from external flooding.

In an embodiment, a Border Gateway Protocol (BGP) router includes circuitry configured to obtain a plurality of prefix-lists one or more of (i) in local Outbound Route Filtering (ORF) and (ii) in ORF from upstream Border Gateway Protocol (BGP) routers, automatically apply logical set operations on the plurality of prefix-lists to determine an aggregated ORF for a downstream BGP router, and propagate the aggregated ORF to the downstream BGP router which uses the aggregated ORF for BGP advertisements. The automatically apply can include auto generation of sequence numbers for the plurality of prefix-lists in the aggregated ORF, such that the downstream BGP router uses the sequence numbers for precedence in the advertisements.

The plurality of prefix-lists can include one or more PERMIT lists, DENY lists, and a combination of PERMIT and DENY lists, with the logical set operations including union with the PERMIT lists, intersection with the DENY lists, and a combination of union, intersection, and set differences with the combination of PERMIT and DENY lists. The automatically apply can include auto generation of sequence numbers for the plurality of prefix-lists in the aggregated ORF, such that the downstream BGP router uses the sequence numbers for precedence in the advertisements, the precedence includes preferring PERMIT lists over DENY lists and a local BGP router's ORFs over upstream BGP routers ORFs.

The plurality of prefix-lists can include PERMIT lists, with the logical set operations including union with the PERMIT lists. The plurality of prefix-lists can include DENY lists, with the logical set operations including intersection with the DENY lists. The plurality of prefix-lists can include a combination of PERMIT and DENY lists, with the logical set operations including a combination of union, intersection, and set differences with the combination of PERMIT and DENY lists. The circuitry can be further configured to utilize a configuration parameter in BGP to enable or disable the automatically apply.

In other embodiments, the present disclosure includes a method having steps and a non-transitory computer-readable medium storing instructions that, when executed cause circuitry to perform the steps. The steps include obtaining a plurality of prefix-lists one or more of (i) in local Outbound Route Filtering (ORF) and (ii) in ORF from upstream Border Gateway Protocol (BGP) routers; automatically applying logical set operations on the plurality of prefix-lists to determine an aggregated ORF for a downstream BGP router; and propagating the aggregated ORF to the downstream BGP router which uses the aggregated ORF for BGP advertisements. The automatically applying can include auto generation of sequence numbers for the plurality of prefix-lists in the aggregated ORF, such that the downstream BGP router uses the sequence numbers for precedence in the advertisements.

The plurality of prefix-lists can include one or more PERMIT lists, DENY lists, and a combination of PERMIT and DENY lists, with the logical set operations including union with the PERMIT lists, intersection with the DENY lists, and a combination of union, intersection, and set differences with the combination of PERMIT and DENY lists. The automatically apply can include auto generation of sequence numbers for the plurality of prefix-lists in the aggregated ORF, such that the downstream BGP router uses the sequence numbers for precedence in the advertisements, the precedence includes preferring PERMIT lists over DENY lists and a local BGP router's ORFs over upstream BGP routers ORFs. The plurality of prefix-lists can include PERMIT lists, with the logical set operations including union with the PERMIT lists. The plurality of prefix-lists can include DENY lists, with the logical set operations including intersection with the DENY lists. The plurality of prefix-lists can include a combination of PERMIT and DENY lists, with the logical set operations including a combination of union, intersection, and set differences with the combination of PERMIT and DENY lists.

BRIEF DESCRIPTION OF THE DRAWINGS

The present disclosure is detailed through various drawings, where like components or steps are indicated by identical reference numbers for clarity and consistency.

FIGS. 3A-3O are various network diagrams illustrating automated filter propagation in a mesh network.

DETAILED DESCRIPTION OF THE DISCLOSURE

Again, ORF is a route filtering capability expressed in RFC5291. This technique is used to suppress route advertisements at the source itself, instead of filtering the routes from incoming updates, thus allowing BGP to consume less BGP router resources eventually leading to better scale and avoiding internet outages due to loops. ORF reduces the size of Router Information Base (RIB) as well as the number of incoming updates. In addition, ORF allows only authorized prefixes to be accepted from upstream BGP routers. Thus, filter configuration is important as it can lead to network outages, e.g., a well documentation situation occurred where an outage was caused by a planned upgrade to a core network, during which a BGP router's filter was deleted, setting off a chaotic flood of routing messages that crashed the network. Note, since this disclosure pertains to automated ORF propagation in networks, any reference to router(s) pertains to a BGP router.

Typical ORF Configuration

Figure 1:
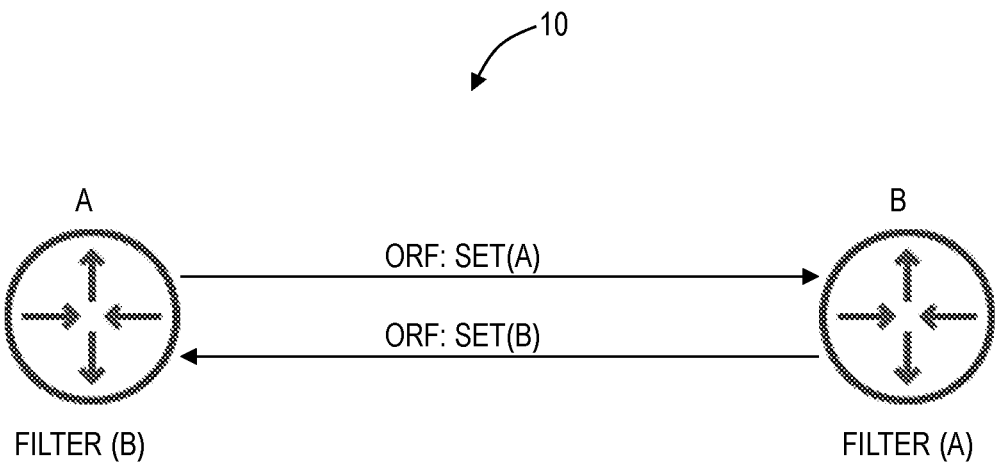
FIG. 1 is a network diagram of a typical ORF configuration in a network between two BGP routers.

FIG. 1 is a network diagram of a typical ORF configuration in a network 10 between two BGP routers A, B. Again, ORF in BGP between the BGP routers A, B is designed to enhance the efficiency and manageability of route advertisement and exchange. ORF allows a BGP router to specify to its BGP peers (i.e., other BGP routers) which routes it is interested in receiving, thereby reducing unnecessary route advertisements, and optimizing bandwidth usage. A BGP session is established between the two BGP-enabled routers A, B. During the BGP session establishment phase, the BGP routers A, B exchange capabilities via OPEN messages. If both BGP routers A, B support ORF, they indicate this in their capabilities, allowing them to use ORF for their route exchanges.

For ORF Policy Creation, the administrator configures ORF policies on one of the BGP routers (let's call it BGP router A). These policies specify the criteria for the routes that BGP router A wants to receive. For example, the policy might include prefixes, prefix lengths, or other attributes that routes must match. The BGP router A then sends these ORF entries (the filtering rules) to its BGP peer, the BGP router B, using BGP ROUTE-REFRESH messages. This informs the BGP router B of the specific types of routes that BGP router A is interested in receiving. Upon receiving the ORF entries from the BGP router A, the BGP router B applies these filtering rules to its outbound route advertisements. This means that the BGP router B will only send route updates to the BGP router A that match the criteria specified in the ORF policies received. When the BGP router B has routes to advertise, it first filters these routes based on the ORF policies from the BGP router A. Only the routes that match the ORF criteria are sent to the BGP router A, significantly reducing unnecessary route advertisements and processing on the BGP router A.

The benefits and outcomes of ORF include
(1) Bandwidth and Resource Optimization: This selective advertisement ensures that only relevant routing information is exchanged, conserving bandwidth and processing resources on both the BGP routers A, B.
(2) Improved Network Performance: By reducing the number of irrelevant route advertisements, ORF can lead to faster routing convergence and improved network performance.
(3) Scalability and Management: ORF aids in the scalability of BGP routing by managing the volume of route exchanges in large networks. It also simplifies the management of routing policies, especially in complex or dynamic routing environments.

In a typical deployment with ORF, a user configures these filters across all the BGP routers A, B based on network planning. This is a tedious and carefully coordinated process since it is prone to errors. In addition to scale, filtering becomes more important to avoid BGP leaks and hijacks. Given the importance of BGP filtering, configuration or system errors should be avoided if possible. The conventional approach includes complex and carefully planned configuration, which is prone to errors and system faults, leading to outages.

Scaling ORF with Automated Propagation

In various embodiments, the present disclosure includes various techniques to automate the ORF filtering for propagation in the network. This approach scales ORF in network deployments. In a network deployment with a large number of BGP peers wanting to reach across the core network using pseudowires, a user will have to provision the ORFs for corresponding many BGP peer sessions. The present disclosure provides an automated solution to avoid such configuration hassles.

Figure 2:
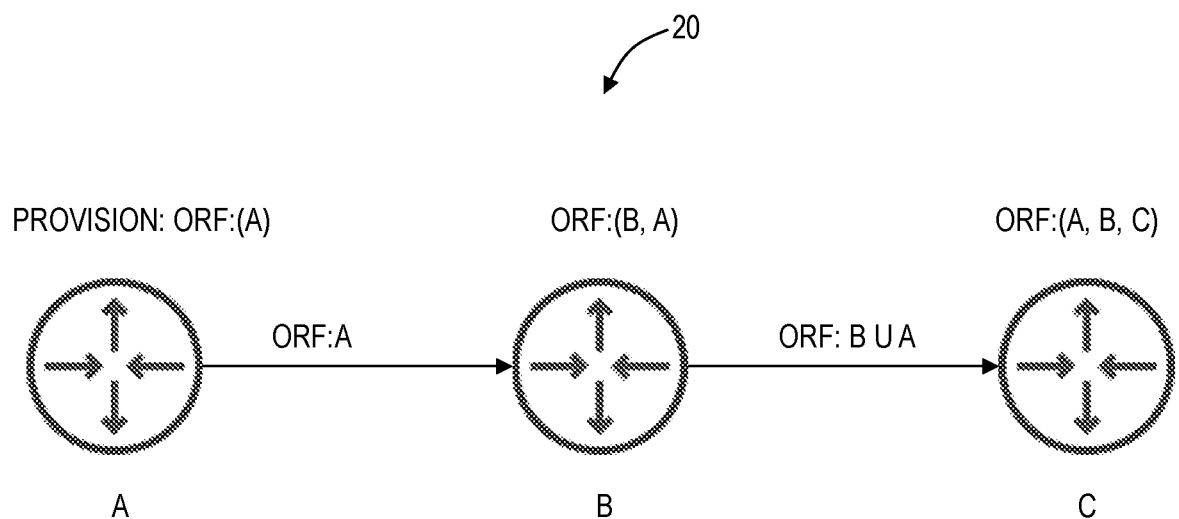
FIG. 2 is a network diagram of a network illustrating ORF aggregation across BGP routers upstream or downstream for scale and for avoiding leaks.

FIG. 2 is a network diagram of a network 20 illustrating ORF aggregation across BGP routers A, B, C, upstream or downstream for scale and for avoiding leaks. The network 20 illustrates a simple example of three BGP routers A, B, C in a chain, for illustrating how ORF filtering has to propagate. Of course, typical networks include far more BGP routers, in a mesh configuration. In this example, the BGP routers A, B, C can be Provider Edge (PE) routers and can be configured as Route Reflectors (RR). An RR within an Autonomous System (AS) has the role of reducing the number of iBGP peering connections needed for route propagation. In this example, each of the BGP routers A, B, C can include customer devices (not shown). The BGP routers A, B, C can be in a hierarchical arrangement where the BGP router A is at level 1 (L1), the BGP router B is at level 2 (L2), and the BGP router C is at level 3 (L3).

In this example, the BGP router A at L1 has a prefix-list to permit referred to as ORF: (A), the BGP routers B, C each have a prefix-list to permit which includes (B) for the BGP router B and (C) for the BGP router C. In addition, the BGP router B, at L2, has to include the prefix-list for the BGP router B, i.e., the overall prefix-list for the BGP router B is ORF: (A, B), and the BGP router C, at L3, has to include the prefix-list for the BGP routers B, C, i.e., the overall prefix-list for the BGP router C is ORF: (A, B, C).

A prefix-list in BGP is a network configuration tool used to match IP prefixes for the purpose of filtering or applying specific policies to those prefixes. It serves as a mechanism to control route advertisement, acceptance, and manipulation, based on the IP address and subnet mask of the routes. Prefix-lists are primarily used to filter routes that a BGP router advertises to or receives from its peers.

As described further herein, the present disclosure uses set operations to automate the configuration of the prefix-lists for propagation of these prefix-lists. Of note, the present disclosure contemplates standard ORF operations, but automates the configuration of the prefix-lists at the BGP routers A, B, C. This is referred to as an automated ORF propagation algorithm.

Given the complexity and operational cost of the ORF provisioning at the BGP routers B, C, the approach described herein includes ORF propagation as an autonomous filter propagation in the network 20. The ORF configuration on L1 RRs, such as the BGP router A, thus gets automatically aggregated towards L2 RRs, such as the BGP router B, and further to L3 RRs, such as L3 RRs, without extra provisioning. That is, in the example of FIG. 2, the prefix-list from the BGP router A is sent to the BGP router B, i.e., ORF: (A). At the BGP router B, the autonomous filter propagation includes performing a union (U) operation between the ORF: (A) and the ORF: (B), sending the prefix-list of ORF: (B U A) to the BGP router C.

Thus, in a linear chain, the intermediate BGP routers, e.g., the BGP router B, are configured to perform autonomous filter aggregation, using various set operations and PERMIT/DENY. For example, the BGP router B is configured with logic to take its prefix-list (ORF: (B)) and the prefix-list from the BGP router A, (ORF: (A)), and perform an aggregation operations, e.g., PERMIT A U B and DENY the rest. That is, intermediate BGP routers can perform an automated aggregation of various prefix-lists in ORF, including a BGP router's own/local ORF and any upstream BGP router's ORFs. This automated aggregation can be a PERMIT operation for a union of all of the prefix-lists, a DENY operation for an intersection of all of the prefix-lists, or a combination thereof. However, in a tree, hub-spoke, or a mesh topology, such a propagation is more complex, given the fact that the filters could be either PERMIT/DENY in a mesh topology.

FIGS. 3A-3C are various network diagrams illustrating automated filter propagation in a mesh network 30. In particular, the network 30 in each of FIGS. 3A-3C is a simplified mesh network of BGP routers R1-R6, for illustrating the autonomous filter aggregation. Of course, those skilled in the art will recognize larger networks are contemplated and the network 30 is presented for simplicity of illustration. FIG. 3A illustrates a PERMIT operation, FIG. 3B illustrates a DENY operation, and FIG. 3C illustrates a combination of PERMIT and DENY. The PERMIT operation means to include all designated prefixes whereas a DENY operation means to exclude all designated prefixes.

FIGS. 3A-3O describe downstream prefix filtering, from the BGP routers R1-R3 towards the BGP router R6, and those skilled in the art will recognize the same approach can be used for upstream prefix advertisements. In FIG. 3A, the L1 BGP routers R1, R2, R3 each implement logic of PERMIT the set of their prefixes, namely R1 is ORF: PERMIT set {R1}, R2 is ORF: PERMIT set {R2}, and R3 is ORF: PERMIT set {R3}. Note, the PERMIT operations is performed at the BGP routers R1, R2, R3 and the resulting prefixes are sent to the BGP routers R4, R5. At the BGP router R4, the logic is PERMIT the set of {R1 U R2 U R3} U R4. That is, the BGP router R4 performs a union operation on the sets for the BGP routers R1, R2, R3 along with a union for its local set, R4. At the BGP router R5, the logic is PERMIT the set of {R1 U R2 U R3} U R5. That is, the BGP router R5 performs a union operation on the sets for the BGP routers R1, R2, R3 along with a union for its local set, R5. The BGP routers R4, R5 send the results of their corresponding logical operations to the BGP router R6.

Of note, the terms "upstream" and "downstream" as used in the art is relative to traffic flow. In this example, the ORF filtering is performed at BGP routers R4, R5, e.g., where R1, R2, R3 are the upstream BGP routers, and the BGP router R6 is the downstream BGP router. Of course, a practical network embodiment is bidirectional, but the example descriptions herein focus on a single flow of ORFs from the upstream BGP routers R1, R2, R3 to the BGP routers R4, R5 which provide aggregated ORF to the downstream BGP router R6.

In FIG. 3B, the L1 BGP routers R1, R2, R3 each implement logic of DENY the prefixes outside of their set, namely R1 is ORF: DENY set {R1}, R2 is ORF: DENY set {R2}, and R3 is ORF: DENY set {R3}. Note, the DENY operations is performed at the BGP routers R1, R2, R3 and the resulting prefixes are sent to the BGP routers R4, R5. At the router R4, the logic is DENY the intersection of {R1, R2, R3} U R4. That is, the BGP router R4 performs an intersection operation on the sets for the BGP routers R1, R2, R3 along with a union for its local set, R4. At the BGP router R5, the logic is DENY the intersection of {R1, R2, R3} U R5. That is, the BGP router R5 performs an intersection operation on the sets for the BGP routers R1, R2, R3 along with a union for its local set, R5. The BGP routers R4, R5 send the results of their corresponding logical operations to the BGP router R6.

In FIG. 3C, the L1 BGP routers R1, R2, R3 each implement logic of PERMIT some of the prefixes and DENY some of the prefixes, namely R1 is ORF: PERMIT set {R1} DENY set {R1'}, R2 is ORF: PERMIT set {R2} DENY set {R2'}, and R3 is ORF: PERMIT set {R3} DENY set {R3'}. At the BGP router R4, the logic is as follows ORF:
  A={R1 U R2 U R3}
  B=intersect {R1, R2, R3}
  C=intersect {A, B}
  DENY {B\C} U R4': where \ is a set difference operation
  PERMIT {A U R4}
At the BGP router R5, the logic is as follows ORF:
  A={R1 U R2 U R3}
  B=intersect {R1, R2, R3}
  C=intersect {A, B}
  DENY {B \ C} U R5': where \ is a set difference operation
  PERMIT {A U R5}

Again, FIGS. 3A-3C describe downstream prefix filtering, from the BGP routers R1-R3 towards the BGP router R6, and those skilled in the art will recognize the same approach can be used for upstream prefix advertisements. Of note, one cannot use a union of ORF filter sets for DENY actions, since it may lead to incomplete/no routing information advertisements across the network. In addition, the combination of PERMIT/DENY ORFs need to prune the intersection of PERMIT/DENY from DENY ORFs, i.e., DENY only the prefixes which are not requested by any of the nodes in the network.

Given the above ORF filter sets get aggregated by the protocol itself, the network converges itself based on the local BGP router's configuration and no additional ORFs. As the scale of this network increases, one can imagine that these ORFs could go beyond hundreds. Additionally, reconfiguration on prefix migration or network expansions is operationally expensive, diminishing the value of ORFs, which are critical to proper functioning of the network.

ORF Operation on BGP Speaker to its Peer

Figure 4:
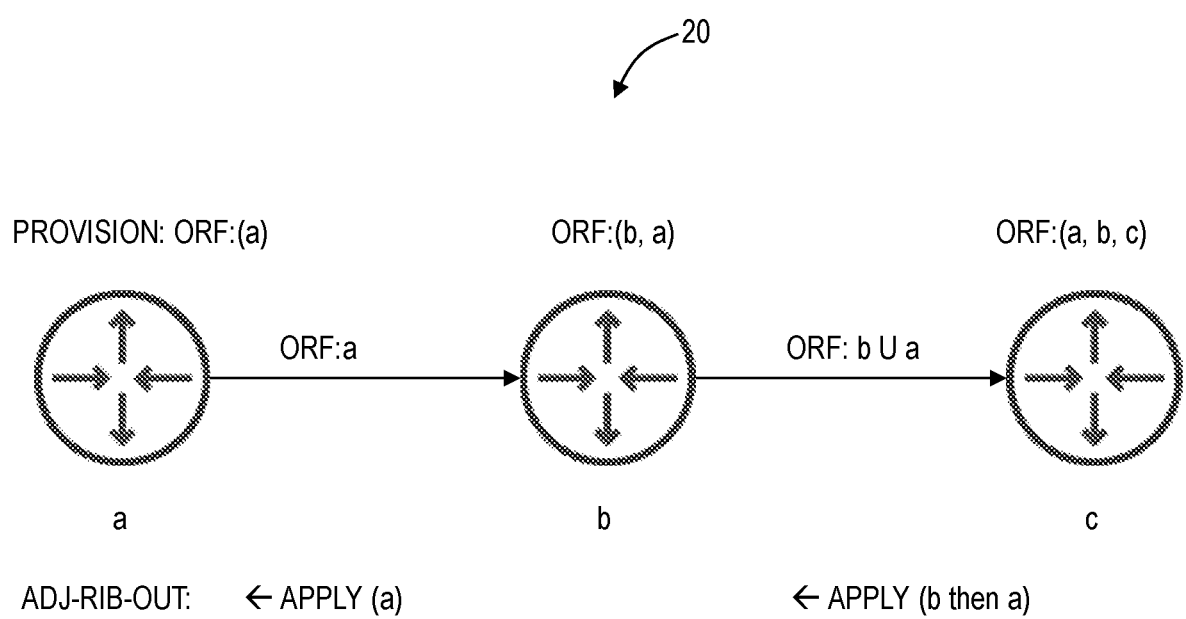
FIG. 4 is a network diagram of the network illustrating ORF in operation with linear ORF propagation.

In cases of ORF propagation, the local ORF for the peer takes precedence in Adjacent Routing Information Base-Out (ADJ-RIB-OUT) on BGP speaker to the corresponding peer. This allows ORF propagation to not violate any existing ORF behaviors. FIG. 4 is a network diagram of the network 20 illustrating ORF in operation with linear ORF propagation. This expands from FIG. 2 which illustrated the ORF aggregation across BGP routers A, B, C. Now, the BGP routers B, C have the ORF filters installed and operate as BGP speakers. The router C for BGP prefix updates to the BGP router B will apply the ORF set for the BGP router B first, and then the ORF set for the BGP router.

Thus, peer ORF takes precedence to any other aggregation rules when applied to a corresponding peer in ADJ-RIB-OUT. This rule is then extended further outwards on each BGP speaker to be applied to ADJ-RIB-OUT for advertisements. In BGP, the routing information that a BGP router manages is stored in several databases or Routing Information Bases (RIBs), each serving a different purpose in the BGP decision process. A BGP router includes an ADJ-RIB-IN, a local RIB, and ADJ-RIB-OUT. The ADJ-RIB-IN stores routing information received from other BGP peers before any processing is applied. The Loc-RIB (Local RIB) contains the best routes selected by the BGP process from the information in the ADJ-RIB-IN. The ADJ-RIB-OUT includes routes that the BGP router has selected to advertise to specific BGP peers. This RIB contains the routes after they have been processed by the BGP router's outbound policies (such as ORF filtering, route-maps, or prefix-lists) but before they are actually sent out.

Auto-Generated Sequence Numbering

In the present disclosure, the aggregated ORF when sent upstream to a BGP router generates auto-generated sequence numbering to merge ORF prefix-lists. The auto generated sequence numbers follow the logic presented in the following table.

TABLE 1

ORF list application on R5 above where |R4_P| indicates cardinality of set R4_P, and p is the starting sequence number, and | . . . | indicates cardinality of a set.

| MATCH | Prefix list | SEQUENCE NUMBERS |
|---|---|---|
| PERMIT LOCAL | R4_P | p, p + 1, . . . , p + |R4_P| − 1 |
| PERMIT REMOTE | {R1_P U R2_P U R3_P} = P1 | p + |R4_P|, . . . , p + |R4_P| + |P1| − 1 |
| DENY LOCAL | R4_D | p + |R4_P| + |P1|, . . . , p + |R4_P| + |P1| + |R4_D| − 1 |
| DENY REMOTE | {R1_D X R2_D X R3_D} = D1 | p + |R4_P| + |P1| + |R4_D|, . . . , p + |R4_P| + |P1| + |R4_D| + |D1| |

Since the order of ORF application on ADJ-RIB-OUT is defined by the combination of match and the sequence numbers, the generated sequence numbers give precedence to local BGP router's ORF PERMIT list, then the remote BGP routers' PERMIT list followed by local BGP routers' DENY list and ending with the remote BGP routers' DENY list.

Figure 5:
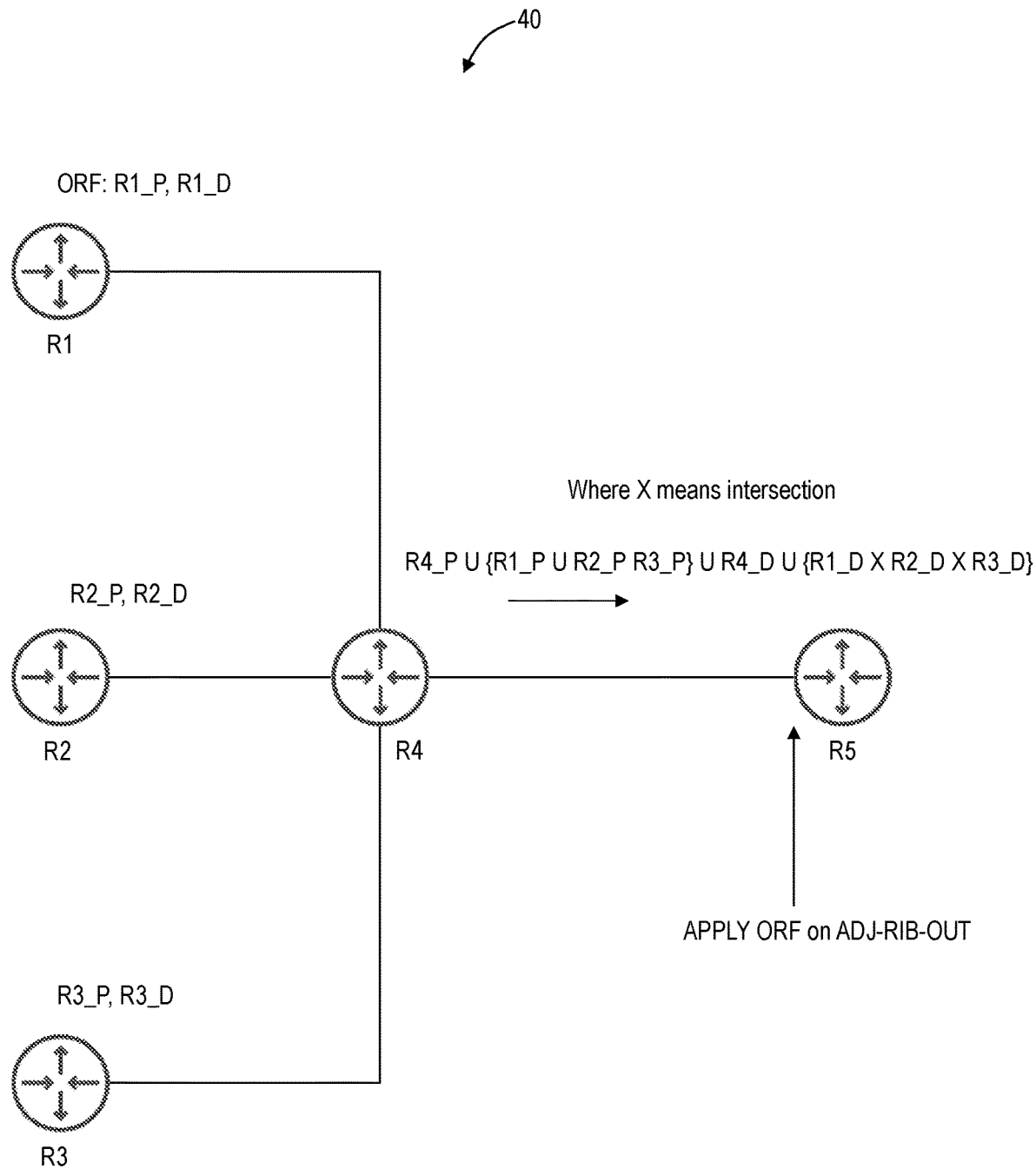
FIG. 5 is a network diagram of a network for illustrating an example of precedence by a BGP router R4 sending its ORF prefix-list to a BGP router R5.

FIG. 5 is a network diagram of a network 40 for illustrating an example of precedence by a BGP router R4 sending its ORF prefix-list to a BGP router R5. Here, the BGP router R4 is connected to BGP routers R1, R2, R3, and receives their aggregated ORF, including ORF: R1_P (PERMIT), R1_D (DENY), R2_P (PERMIT), R2_D (DENY), R3_P (PERMIT), R3_D (DENY). Now, the BGP router R4 has to perform the set operations described herein to consolidate these lists along with BGP router R4's lists-OFR: R4_P (PERMIT), R4_D (DENY). Based on table 1 above, this include:

R4_P U {R1_P U R2_P R3_P} U R4_D U {R1_D X R2_D X R3_D}

The resulting prefixes are sent to the neighboring BGP router R5 and applied on BGP router R5's ADJ-RIB-OUT. The above scheme allows for correct order of ORF rules to be applied and advertised to the peer nodes. By applying R4_D after "PERMIT REMOTE", in the above table, we also avoid issues due to operator misconfiguration where a LOCAL DENY cancels REMOTE PERMITS.

eBGP Operations

Concerning eBGP interfaces, the proposed ORF propagation safeguards an AS from getting flooded with unnecessary routes, thus safeguarding the RIB/FIB from blackholing the traffic, as happened in the past.

Interoperability

Advantageously, the approach described herein is implemented at each BGP router and uses existing BGP signaling, thus is easy to incorporate and allows the BGP network operations to be simplified with ORFs.

Process

Figure 6:
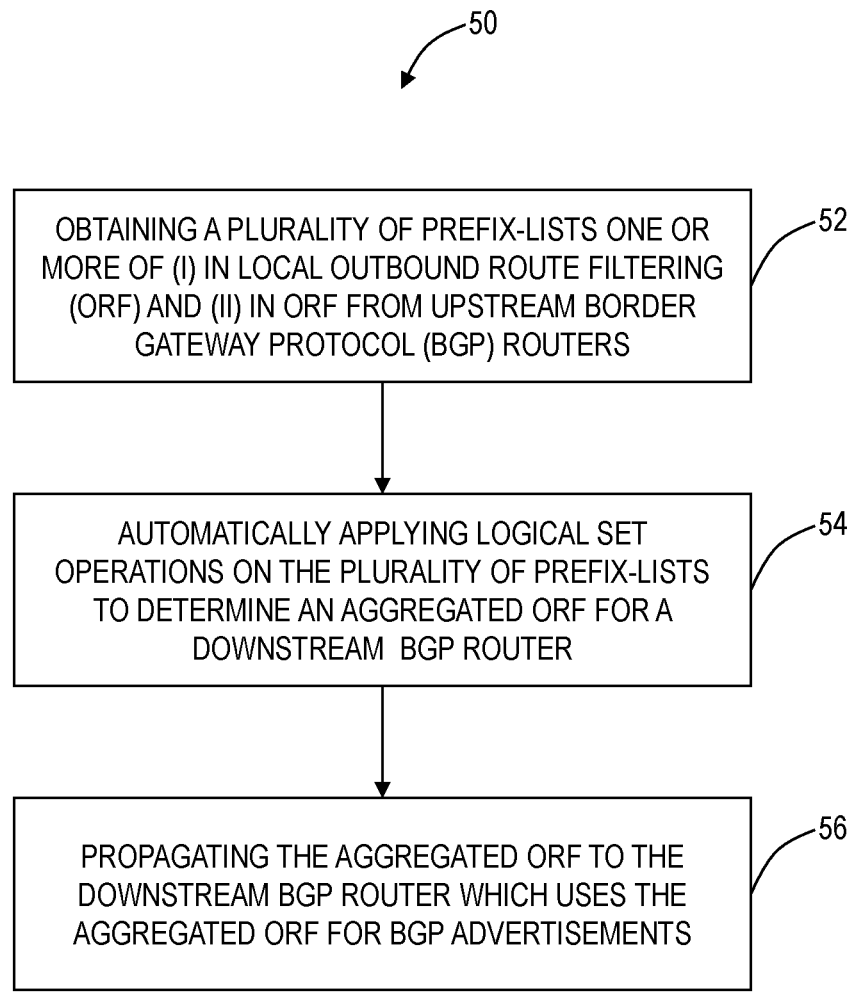
FIG. 6 is a flowchart of a process for automated Outbound Route Filter (ORF) propagation in Border Gateway Protocol (BGP) networks.

FIG. 6 is a flowchart of a process 50 for automated Outbound Route Filter (ORF) propagation in Border Gateway Protocol (BGP) networks. The process 50 contemplates implementation as a method having steps, via an apparatus configured to implement the steps, and as a non-transitory computer-readable medium storing instructions that, when executed, cause one or more processors to implement the steps. Variously, the apparatus can be a BGP router, a BGP speaker, a Route Reflector (RR), or even a combination thereof.

The process 50 includes obtaining a plurality of prefix-lists one or more of (i) in local Outbound Route Filtering (ORF) and (ii) in ORF from upstream Border Gateway Protocol (BGP) routers (step 52); automatically applying logical set operations on the plurality of prefix-lists to determine an aggregated ORF for a downstream BGP router (step 54); and propagating the aggregated ORF to the downstream BGP router which uses the aggregated ORF for BGP advertisements (step 56). Note, the term obtaining means one or more of reading from memory, receiving the prefix-lists from connected devices, receiving a configuration from a user or other device, and the like. The automatically applying can include auto generation of sequence numbers for the plurality of prefix-lists in the aggregated ORF, such that the downstream BGP router uses the sequence numbers for precedence in the advertisements. Again, the terms upstream and downstream are relative to traffic flow, and an upstream BGP router will provide its prefix-lists in ORF to downstream BGP routers for determining prefixes in BGP advertisement towards upstream BGP routers.

In an embodiment, the plurality of prefix-lists can include one or more PERMIT lists, DENY lists, and a combination of PERMIT and DENY lists, with the logical set operations including union with the PERMIT lists, intersection with the DENY lists, and a combination of union, intersection, and set differences with the combination of PERMIT and DENY lists. The automatically applying can include auto generation of sequence numbers for the plurality of prefix-lists in the aggregated ORF, such that the downstream BGP router uses the sequence numbers for precedence in the advertisements, the precedence includes preferring PERMIT lists over DENY lists and a local BGP router's prefix-lists over upstream BGP routers prefix-lists.

In another embodiment, the plurality of prefix-lists can include PERMIT lists, with the logical set operations including union with the PERMIT lists. In a further embodiment, the plurality of prefix-lists can include DENY lists, with the logical set operations including intersection with the DENY lists. In another further embodiment, the plurality of prefix-lists can include a combination of PERMIT and DENY lists, with the logical set operations including a combination of union, intersection, and set differences with the combination of PERMIT and DENY lists. The process 50 can also include utilizing a configuration parameter in BGP to enable or disable the automatically apply. Here, a configuration parameter can be added to the BGP protocol to enable/disable such ORF aggregation for PERMIT/DENY actions.

CONCLUSION

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each potentially equipped with one or more processors. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. Additionally, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments.

What is claimed is:

1. A Border Gateway Protocol (BGP) router comprising circuitry configured to:
   obtain a plurality of prefix-lists for one or more of (i) local Outbound Route Filtering (ORF) and (ii) ORF at upstream Border Gateway Protocol (BGP) routers,
   automatically apply logical set operations on the plurality of prefix-lists to determine an aggregated ORF filter set for a downstream BGP router, and
   propagate the aggregated ORF filter set to the downstream BGP router which uses the aggregated ORF filter set for BGP advertisements.

2. The BGP router of claim 1, wherein the automatically apply includes auto generation of sequence numbers for the plurality of prefix-lists in the aggregated ORF filter set, such that the downstream BGP router uses the sequence numbers for precedence in the BGP advertisements.

3. The BGP router of claim 1, wherein the plurality of prefix-lists include one or more PERMIT lists, DENY lists, and a combination of PERMIT and DENY lists, with the logical set operations including union with the PERMIT lists, intersection with the DENY lists, and a combination of union, intersection, and set differences with the combination of PERMIT and DENY lists.

4. The BGP router of claim 3, wherein the automatically apply includes auto generation of sequence numbers for the plurality of prefix-lists in the aggregated ORF filter set, such that the downstream BGP router uses the sequence numbers for precedence in the BGP advertisements, the precedence includes preferring PERMIT lists over DENY lists and a local BGP router's prefix-lists over an upstream BGP router's prefix-lists.

5. The BGP router of claim 1, wherein the plurality of prefix-lists include PERMIT lists, with the logical set operations including union with the PERMIT lists.

6. The BGP router of claim 1, wherein the plurality of prefix-lists include DENY lists, with the logical set operations including intersection with the DENY lists.

7. The BGP router of claim 1, wherein the plurality of prefix-lists include a combination of PERMIT and DENY lists, with the logical set operations including a combination of union, intersection, and set differences with the combination of PERMIT and DENY lists.

8. The BGP router of claim 1, wherein the circuitry is further configured to
utilize a configuration parameter in BGP to enable or disable the automatically apply.

9. A method comprising steps of:
obtaining a plurality of prefix-lists for one or more of (i) local Outbound Route Filtering (ORF) and (ii) ORF at upstream Border Gateway Protocol (BGP) routers;
automatically applying logical set operations on the plurality of prefix-lists to determine an aggregated ORF filter set for a downstream BGP router; and
propagating the aggregated ORF filter set to the downstream BGP router which uses the aggregated ORF filter set for BGP advertisements.

10. The method of claim 9, wherein the automatically applying includes auto generation of sequence numbers for the plurality of prefix-lists in the aggregated ORF filter set, such that the downstream BGP router uses the sequence numbers for precedence in the BGP advertisements.

11. The method of claim 9, wherein the plurality of prefix-lists include one or more PERMIT lists, DENY lists, and a combination of PERMIT and DENY lists, with the logical set operations including union with the PERMIT lists, intersection with the DENY lists, and a combination of union, intersection, and set differences with the combination of PERMIT and DENY lists.

12. The method of claim 11, wherein the automatically apply includes auto generation of sequence numbers for the plurality of prefix-lists in the aggregated ORF filter set, such that the downstream BGP router uses the sequence numbers for precedence in the BGP advertisements, the precedence includes preferring PERMIT lists over DENY lists and a local BGP router's prefix-lists over an upstream BGP router's prefix-lists.

13. The method of claim 9, wherein the plurality of prefix-lists include PERMIT lists, with the logical set operations including union with the PERMIT lists.

14. The method of claim 9, wherein the plurality of prefix-lists include DENY lists, with the logical set operations including intersection with the DENY lists.

15. The method of claim 9, wherein the plurality of prefix-lists include a combination of PERMIT and DENY lists, with the logical set operations including a combination of union, intersection, and set differences with the combination of PERMIT and DENY lists.

16. A non-transitory computer-readable medium comprising instructions that, when executed cause circuitry to perform steps of:
obtaining a plurality of prefix-lists for one or more of (i) local Outbound Route Filtering (ORF) and (ii) ORF at upstream Border Gateway Protocol (BGP) routers;
automatically applying logical set operations on the plurality of prefix-lists to determine an aggregated ORF filter set for a downstream BGP router; and
propagating the aggregated ORF filter set to the downstream BGP router which uses the aggregated ORF filter set for BGP advertisements.

17. The non-transitory computer-readable medium of claim 16, wherein the automatically applying includes auto generation of sequence numbers for the plurality of prefix-lists in the aggregated ORF filter set, such that the downstream BGP router uses the sequence numbers for precedence in the BGP advertisements.

18. The non-transitory computer-readable medium of claim 16, wherein the plurality of prefix-lists include one or more PERMIT lists, DENY lists, and a combination of PERMIT and DENY lists, with the logical set operations including union with the PERMIT lists, intersection with the DENY lists, and a combination of union, intersection, and set differences with the combination of PERMIT and DENY lists.

19. The non-transitory computer-readable medium of claim 16, wherein the plurality of prefix-lists include PERMIT lists, with the logical set operations including union with the PERMIT lists.

20. The non-transitory computer-readable medium of claim 16, wherein the plurality of prefix-lists include a combination of PERMIT and DENY lists, with the logical set operations including a combination of union, intersection, and set differences with the combination of PERMIT and DENY lists.

* * * * *